Aug. 24, 1954  A. H. EDWARDS  2,687,015

BOOT FOR MASTER CYLINDERS

Filed Jan. 18, 1949

INVENTOR.

Arthur H. Edwards,

BY

Harness and Harris

ATTORNEYS

Patented Aug. 24, 1954

2,687,015

UNITED STATES PATENT OFFICE 2,687,015

BOOT FOR MASTER CYLINDERS

Arthur H. Edwards, Farmington, Mich., assignor to Chrysler Corporation, Highland Park, Mich., a corporation of Delaware Application January 18, 1949, Serial No. 71,475

4 Claims. (Cl. 60—54.6)

My invention relates to boot structures for forming a seal between a relatively reciprocable piston rod and cylinder elements.

More particularly, my invention pertains to an improved motor vehicle master cylinder boot structure.

It is a principal object of my invention to provide a vehicle master cylinder with an improved flexible boot structure for eliminating leakage of brake fluid from the cylinder as well as preventing the influx of dirt and other foreign matter into the cylinder.

Another object of my invention is to provide in a master cylinder, a boot structure having a combined base plate and piston stop member which cooperate with the boot of the structure to produce a secure compression type seal at the juncture of the boot structure and the master cylinder and which also serves as an abutment for limiting outward movement of the piston of the master cylinder.

A further object of my invention is to provide a boot element in a master cylinder boot structure which is uniformly and symmetrically compressible and thus not susceptible to break-down by repeated flexure in operation.

Still another object of my invention is to provide a boot structure that is durable in construction as well as economical to manufacture.

Other objects and advantages of my invention will become more apparent from the following description of one embodiment of my invention, reference being had to the accompanying drawing in which.

Figures 1, 2, 3, 4:
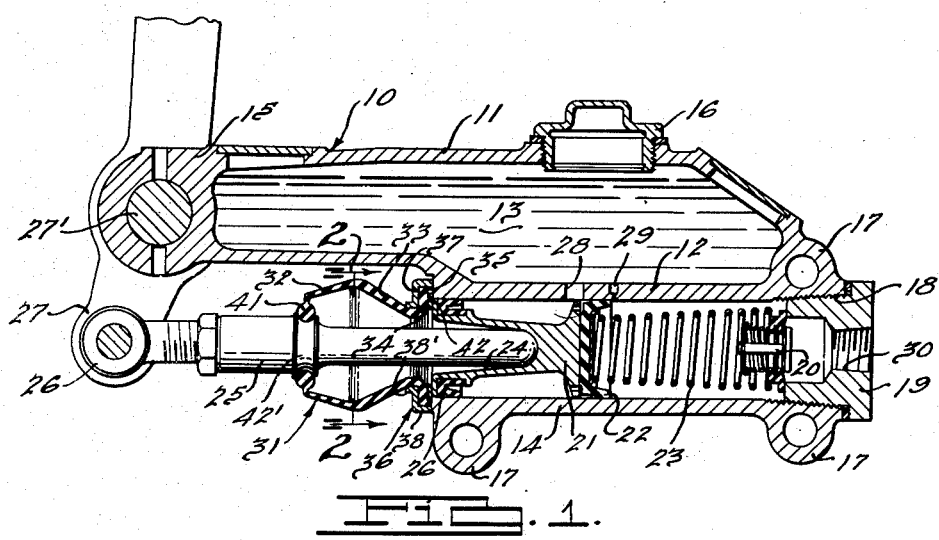
Fig. 1 is a vertical sectional view of a motor vehicle brake system master cylinder embodying my invention.
Fig. 2 is a transverse sectional view taken on the line 2—2 of Fig. 1.
Fig. 3 is a fragmentary vertical sectional view of my improved boot structure, shown in Fig. 1 illustrating the boot element of the structure in a compressed or brake applied position.
Fig. 4 is a fragmentary left end view of the boot and master cylinder assembly shown in Fig. 3.

In the drawing I have shown a master cylinder of a vehicle brake system, generally designated by the numeral 10, which is of conventional structure and comprises an outer casing 11 having an inner wall 12 which divides the casing into upper and lower chambers. The upper chamber serves as a fluid reservoir chamber 13 while the lower chamber comprises a cylinder 14. The casing 11 is provided with conventional structural details such as a pivot bearing 15, a fluid inlet cap 16 and lugs 17 which serve to secure the master cylinder to appropriate structure of a motor vehicle. The cylinder 14 has an open right end 18 which is threaded to receive a plug 19 provided with a valve mechanism 20. A piston 21, slidably mounted in the cylinder 14 has an inner end in engagement with a piston cup 22 which is urged against the piston 21 by one end of a piston return spring 23. The piston 21 is provided with a recess 24 for receiving one end portion of a rod 25, which extends into the cylinder 14 through its open left end 26. The outer end of the rod 25 is pivotally connected at 26 to one end of a rotatable lever member 27, which is pivotally connected at 27' to the pivot bearing 15 so that counterclockwise movement of the lever member 27 about its pivotal axis will actuate the rod 25 rightwardly, as viewed in Fig. 1, causing the piston 21 to move in a like direction. The inner wall 12 is provided with ports 28 and 29 which allow hydraulic medium within the chamber 13 to flow into the cylinder 14 so that when the piston 21 is moved in a rightward direction, the hydraulic medium is forced outwardly through the valve 20 and the passageway 30 within the plug 19 to the fluid pressure lines of a vehicle brake system in the conventional manner.

The open end 26 of the cylinder 14 is provided with boot structure generally designated by the numeral 31 which not only prevents the entrance of foreign matter into the cylinder or leakage of hydraulic medium from the cylinder, but also prevents the piston 21 from extending out of the cylinder 14. The boot structure 31 comprises a boot member 31' of yieldable, rubber-like material which comprises a pair of frustro-conical sections 32 and 33 of circular cross section, integrally joined at the larger bases thereof. The small base of the portion 33 is provided with a radially extended annular lip 34 which is integrally connected to an axially extended end portion 35. The right extremity of the end portion 35 of the boot member 31' engages the outer surface of the casing 11 directly adjacent the open end 26 of the cylinder 14 in sealing relationship and is maintained in such relationship by a metallic mounting bracket 36. The bracket 36 includes concentric, relatively large and small diameter hollow cylindrical portions 38 and 38' which are spaced axially with respect to the axis of the cylinder 14 and integrally connected by a radial wall 37 which forms a seat for the lip 34. The radially extending annular lip 34 and end portion 35 of the boot member 31' are received in the large diameter cylindrical portion 38 of the bracket 36 and clampingly secured by it to the casing 11 by bolts 39 which extend through ears 40 provided on the bracket 36. The large diameter cylindrical portion 38 is somewhat shorter in axial length than the combined axial length of the end portion 35 and thickness of the lip 34 of the boot member 31', and therefore the radial wall 37 of the bracket urges the extremity of the end portion 35 into sealing engagement with the outer surface of the casing 11. The large cylindrical portion 38 of the bracket has a diameter substantially the same as the outer surface of the end portion 35 and therefore it forms an abutment against which the outer periphery of the end portion 35 is urged when the bracket 36 holds the lip 34 and end portion 35 under compression.

A flat metal washer 42 fits within the right annular end portion 35 of the boot member 31' adjacent the right side face of the lip 34. The washer 42 has an outer diameter larger than the diameter of the bore of the cylinder 14 and an inner diameter smaller than the diameter of the bore of the cylinder 14 and the thickness of the washer 42 is sufficient to place the lip 34 under compression when the bracket 36 is firmly bolted in place. When the washer 42 is seated against the lip 34, the outer edge thereof engages the outer surface portions of the casing surrounding the open end 26 of the cylinder 14 and the central portion of the washer projects inwardly toward the axis of the cylinder beyond the wall of the bore of the cylinder and acts as a piston stop to prevent the leftward movement of the piston 21 from within the cylinder 14. The washer 42 also serves to maintain the circular form of the end portion 35 of the boot and to hold it against inward deflection so that when the end portion 35 is engaged by the cylindrical portion 38 of the bracket 36, a seal is maintained between the end portion 35 and the surfaces of the casing 11 surrounding the open end 26 of the cylinder 14.

The thickness of the wall of the frustro-conical portion 32 is tapered from a maximum thickness adjacent the section 33 thereof to a minimum thickness at the left end of the boot, as viewed in Fig. 1. A bead 41 of circular cross section is integrally formed on the left extremity of the wall of the boot section 32 and is contractively seated in sealing relationship in an annular groove 42' of arcuate cross section, formed in the rod 25. By employing a boot member having one section provided with a wall of tapered thickness, the location in the boot at which deflection occurs under the compression to which the boot is subjected during rightward movement of the piston rod 25 may be accurately predetermined and controlled. In the boot shown in the drawing, the deflection occurs at a location spaced from the extremity thereof which is sealingly clamped on the casing 11, and thus disturbing of the seal is avoided. The symmetrical distribution of deflection of the wall of the boot adds to its life since any force applied to the boot member is evenly distributed throughout its entirety and no particular points are subjected to constant abusive compression and expansion which would tend to cause undue wear at these points.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a master cylinder having a piston rod adapted to actuate a piston in said cylinder; structure adapted to form a closure of the open end of said cylinder comprising a yieldable boot element adapted to be disposed around said rod and including two frusto-conical portions integrally joined at their larger ends, one of said portions being adapted to engage said rod and the other of said portions being provided with an outwardly extending annular lip having an axially extending edge portion, a washer seated against said lip and having an opening adapted to allow that passage of said rod, said washer being adapted to restrain the movement of said piston out of said cylinder, and retaining means engaging said boot element and adapted to secure said element and said washer to said cylinder, said means cooperating with said washer to hold said lip under compression and being adapted to maintain said edge portion in sealing engagement with said cylinder.

2. In a vehicle master cylinder having a piston rod adapted to actuate said piston within said cylinder, structure adapted to effect the closure of the open end of said cylinder comprising a yieldable boot element adapted to be disposed around said rod and including two frusto-conical portions integrally joined at their larger ends, one of said portions having a tapered wall thickness, the thinnest extremity thereof being integrally joined to a yieldable ring which is adapted to engage said rod, said wall of tapered thickness being thereby adapted to facilitate symmetrical compression of said boot element in response to movement of said rod, the other end of said portions being provided with an outwardly extending annular lip having an axially extending edge portion, a washer seated against said lip and having an opening adapted to receive said rod, said washer being adapted to restrain the movement of said piston out of said cylinder, and means engaging said boot element and adapted to secure said element and said washer to said cylinder, said means cooperating with said washer to hold said lip under compression and being adapted to maintain said edge portion in sealing engagement with said cylinder.

3. In a cylinder, a piston and piston rod assembly including a cylinder having an open end for receiving said piston rod; structure adapted to effect a closure of the open end of said cylinder comprising a flexible boot adapted to seal the open end of said cylinder comprising first and second frusto-conical portions integrally joined at the larger bases thereof, said first portion having a tapered wall thickness, the thinnest extremity thereof being adapted to be carried by said rod, said second portion being provided with an integral flange which is adapted to engage said cylinder in sealing relationship and having a wall thickness at least as thick as the maximum wall thickness of said first wall portion.

4. A device for covering the opening in a surface and for limiting the passage of an article through said opening comprising in combination a substantially cylindrical rubber-like member having a radially extending annular lip at one end thereof provided with an axially extending edge portion, a retaining member adapted to be secured to said surface adjacent said opening and including a raised shoulder engaging the outer surfaces of said lip and said edge portion, and a ported disk-like member carried by the inner surfaces of said lip and edge portion, said disk-like member and said retaining member cooperating to compress said edge portion to thereby form a sealing surface, the port in said disk-like member being of a predetermined size so that portions of said disk-like member will be adapted to extend into the projected limits of said opening to thereby limit movement therethrough.

References Cited in the file of this patent

UNITED STATES PATENTS

| Number | Name | Date |
|---|---|---|
| 1,851,226 | White | Mar. 29, 1932 |
| 1,853,156 | Sobon | Apr. 12, 1932 |
| 1,884,374 | Tatter | Oct. 25, 1932 |
| 2,050,702 | Jackson | Aug. 11, 1936 |
| 2,115,383 | Christensen | Apr. 26, 1938 |
| 2,202,351 | Loweke | May 28, 1940 |
| 2,290,776 | Stillwagon | July 21, 1942 |
| 2,463,695 | Jensen | Mar. 8, 1949 |
| 2,559,857 | Edwards | July 10, 1951 |